Jan. 31, 1961　　　H. A. DORMAN ET AL　　　2,969,936
AIRCRAFT WITH PROPELLER ENCLOSED IN ANNULAR WING
Filed March 13, 1959　　　　　　　　　　　3 Sheets-Sheet 1

INVENTORS
HARLEY A. DORMAN &
BRUCE A. DORMAN.
BY Donnelly, Mentag & Harrington
ATTORNEYS

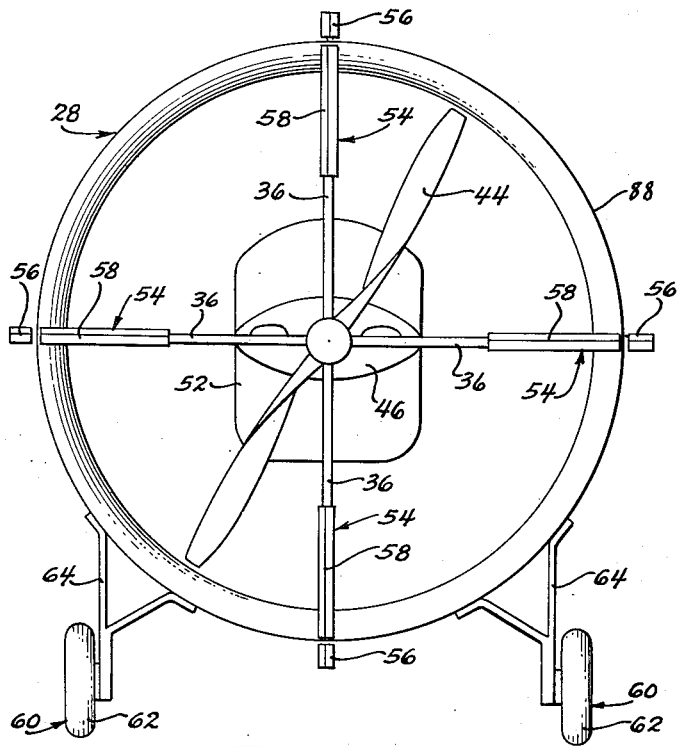
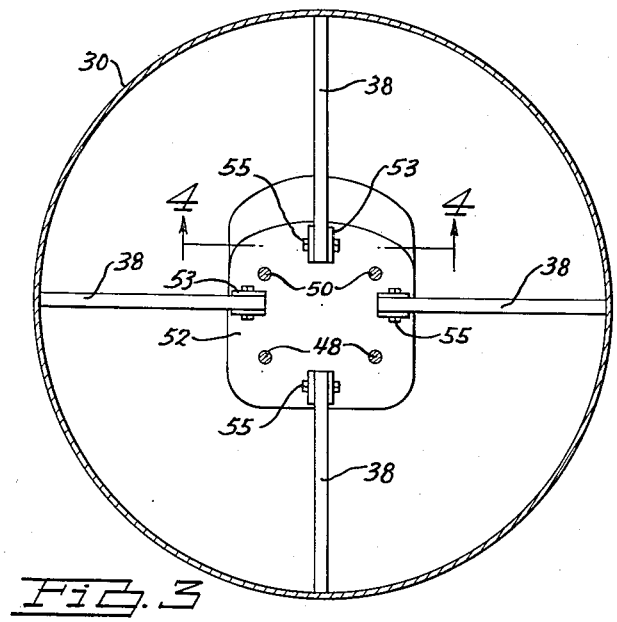
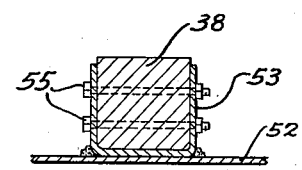

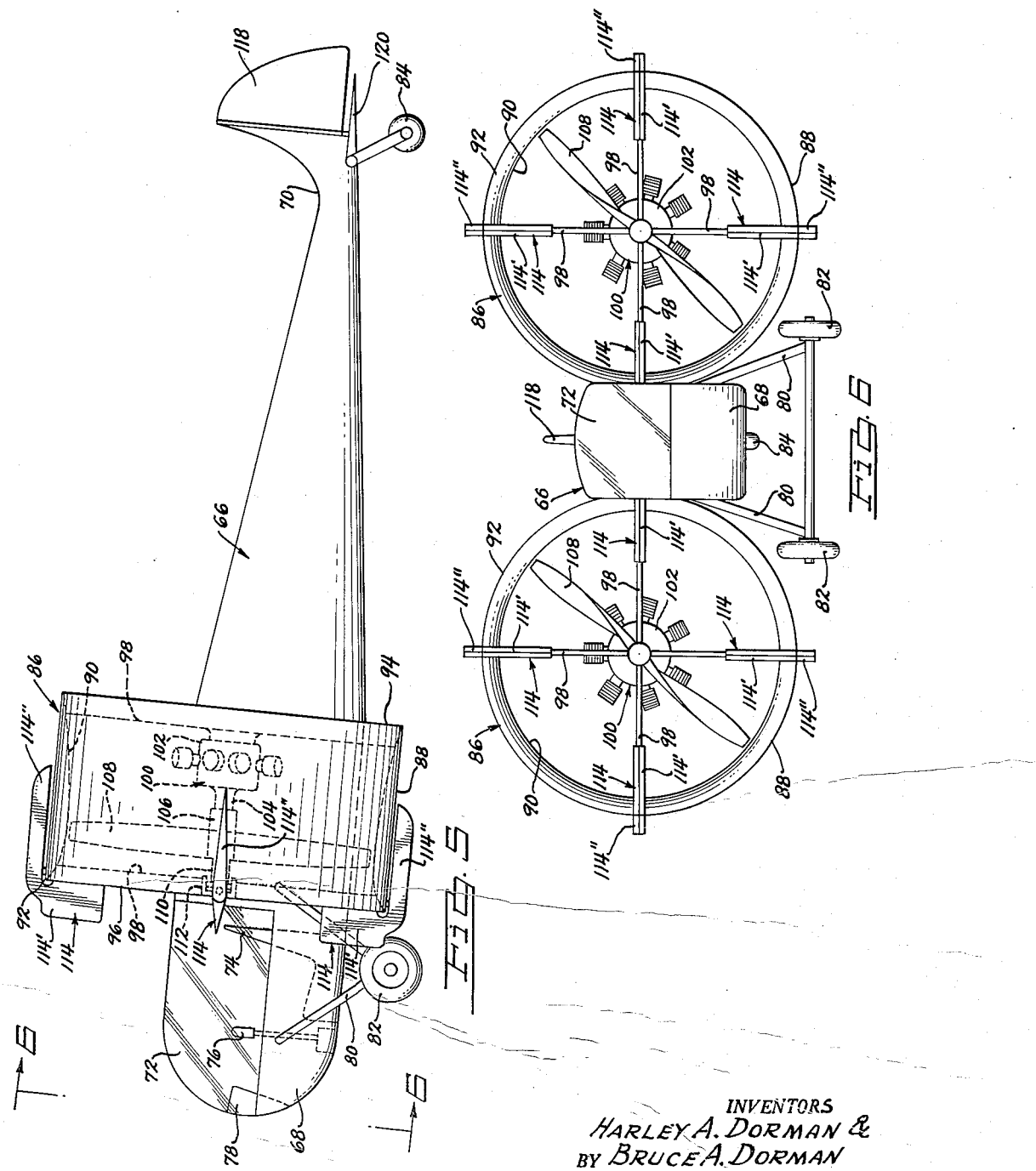

United States Patent Office 2,969,936
Patented Jan. 31, 1961

2,969,936

AIRCRAFT WITH PROPELLER ENCLOSED IN ANNULAR WING

Harley A. Dorman, 2969 Montclair, Detroit, Mich., and Bruce A. Dorman, 5807 Riley Drive, Corpus Christi, Tex.

Filed Mar. 13, 1959, Ser. No. 799,184

9 Claims. (Cl. 244—15)

Our invention relates generally to an aircraft of the heavier than air class, and more particularly to an aircraft in which the flight sustaining forces are functionally related to the rate of air mass displaced by the propulsion means.

According to a principal feature of our instant invention we have provided an aircraft capable of utilizing an unrecognized theory of flight. Our improved aircraft does not require the use of conventional wings of airfoil cross section to obtain lifting force components, although we contemplate that a conventional aircraft may be adapted or converted to utilize the teachings of our invention so that our improved aircraft can be manufactured with a minimum of special tooling.

The instant disclosure forms a continuation-in-part of our co-pending application, S.N. 502,426, filed April 19, 1955, now abandoned. Also, our instant disclosure has features common to our co-pending application, S.N. 705,947, filed December 30, 1957, now Patent No. 2,-951,661.

We contemplate that our improved aircraft may comprise a fuselage and tail section of conventional construction. For example, any of a variety of light planes now used may be successfully modified to incorporate the features of our instant invention.

Our improvement comprises a power tube assembly which includes an annular wing in which the outer peripheral surface lies in a cylindrical plane, the axial length of the wing being approximately equal to the radius of the wing. A power plant is mounted within the annular wing, and for present purposes, this power plant will be described as a propeller driven by an internal combustion, reciprocating, gasoline engine, wherein the axis of the propeller is coextensive with the axis of the annular wing. However, turbine engines, jet engines or other types of engines may also be used. The annular wing has a sharp leading and trailing edge, and this makes possible a shearing of the air so that the ambient air bounded by the outer dimensions of the annular wing may be effectively energized with a minimum amount of disturbance of the air situated radially outward of the annular wing.

We have provided a plurality of transverse struts at the forward or leading edge of the annular wing and another set of transverse struts is provided at the rearward or trailing edge of the annular wing. The radially inward extremities of the forward struts may carry a bearing within which a propeller shaft is journalled, and in accordance with a first embodiment of our invention the rearward struts of the annular wings are fixed to the engine firewall formed by the plane fuselage. The support provided by the firewall and by the forwardly disposed propeller bearing provides a structurally sound assembly.

According to a second embodiment of our invention we have made provision for mounting a pair of power tube assemblies of the type above described wherein the annular wings may be secured to the sides of the fuselage of a conventional aircraft. For example, conventional wing braces may be used for this purpose and the annular wing of each power tube assembly may be tangentially secured to the associated wing bracing. Conventional wing surfaces of airfoil cross section are not required in either this embodiment or in the first embodiment above described.

It is thus apparent that the annular wing can be applied to a conventional aircraft structure with a minimum of modification being required and that the wing can be accommodated without disturbing the engine and the engine mounting structure.

Control surfaces are mounted on the forward transverse struts on the upstream side of the annular wing. These control surfaces may be situated in operating planes disposed 90° with respect to each other, thereby providing both longitudinal and lateral stability. These control surfaces are also capable of compensating for engine torque so that the engine torque reaction can be balanced by an equal and opposite force couple created by the control surfaces to overcome rolling tendencies of the aircraft.

According to a first embodiment of our invention these control surfaces are formed in two parts with one part thereof situated on the upstream side of the annular wing and with another part disposed radially outward in a plane situated perpendicularly relative to the cylindrical peripheral surface of the wing. However, each of the parts are adapted to turn about a radial axis of the annular wing. The outer part above mentioned may be independently controlled for the purpose of counteracting engine torque during operation of the aircraft while in flight. The forwardly disposed part of the control surfaces may therefore be utilized wholly for control purposes. According to a second embodiment of our invention, the radially outward part is adapted to turn in unison with respect to the forwardly disposed part and is adapted to counteract the torque developed on the forward part of the control surfaces. This greatly relieves the stresses on the actuating cable system for the aircraft controls. In the second embodiment the control surfaces are formed of integral construction.

The strategic location of the control surfaces in the fashion above described facilitates better control since the moving air mass is more uniform in the forward region and is relatively free of local pressure disturbances which would tend to make the aircraft unstable.

When the aircraft is in operation the air propulsion means displaces air through the annular wing and all of the air bounded by the stream tube defined by the outer cylindrical peripheral surface of the wing is energized by the air propulsion means. When the rate of mass air displacement through the wing is of sufficient magnitude, a lifting force component will be developed which will balance the force of gravity acting on the centroid of the aircraft and a forward driving thrust will be produced. The frontal area of the fuselage and of the engine is sufficiently small relative to the total area bounded by the periphery of the wind that the displaced air may pass through the wing with only a nominal amount of disturbance.

The provision of an improved aircraft of the type above described being a principal object of our invention, it is a further object of our invention to provide an aircraft which can be readily stored in existing hangar facilities with a minimum amount of space being required.

It is a further object of our invention to provide an aircraft in which the lifting force and thrust components may be obtained independently of any conventional wing surfaces.

It is another object of our invention to provide an aircraft of the type above described which is capable of taking off and landing in a minimum of space and in congested areas.

It is a further object of our invention to provide an improved aircraft of the type above described wherein the power tube assembly can be applied to any of a variety of aircraft of conventional construction.

It is further object of our invention to provide an aircraft of the type above described in which the flight sustaining forces are obtained by energizing all of the air bounded by the stream tube defined by the annular wing and by displacing the air through the wing at the required velocity.

It is a further object of our invention to provide an aircraft of the type above described wherein the annular wing may be readily mounted on a conventional aircraft fuselage with a minimum amount of modification, and wherein the engine and engine mounting will be undisturbed.

It is a further object of our invention to provide an aircraft having a power tube assembly of the type above described wherein vertical and horizontal control surfaces are mounted at an upstream location relative to the annular wing for the purpose of obtaining desired stability and control.

It is a further object of our invention to provide an aircraft of the type above described wherein the power tube assembly controls the displacement of air so as to substantially define an aerodynamic stream tube, the direction assumed by the median stream line of the stream tube being controllable so as to produce the desired components of the associated aerodynamic forces with a minimum amount of losses.

It is a further object of our invention to provide an aircraft having a power tube assembly of the type above set forth and which is characterized by a high degree of maneuverability and by its reduced overall physical dimensions.

Further objects and features of our invention will become apparent from the following description and accompanying drawings wherein:

Fig. 2 is a front elevation view of our aircraft;

Fig. 3 is a cross sectional view of the power tube assembly for our improved aircraft shown in Fig. 1, and is taken along section line 3—3 of Fig. 1;

Fig. 4 is a cross sectional view of a transverse strut for our power tube assembly together with a supporting bracket for securing the same to the forward engine firewall of the aircraft;

Fig. 5 is a side elevation view of a second form wherein the power tube assembly is mounted on either side of the aircraft fuselage.

Fig. 6 is a front elevation view of the aircraft of Fig. 5.

Figure 1:
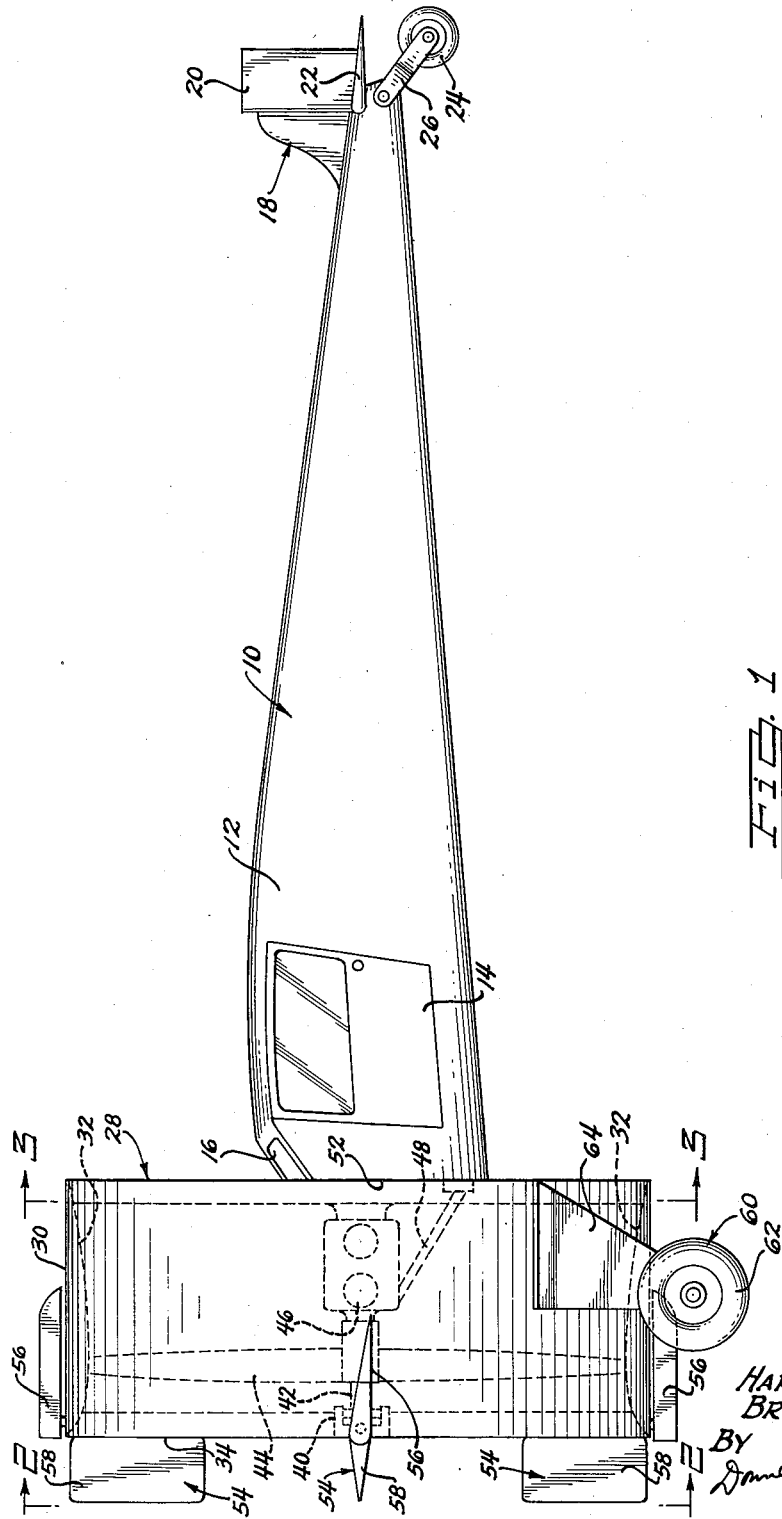
Fig. 1 is a side elevation view of our improved aircraft.

Referring first to Fig. 1, numeral 10 generally designates a fuselage of conventional construction and it includes a pilot compartment 12 accessible through a door 14. Forwardly situated lites 16 provide visibility for the pilot. The rudder 20 and the aileron 22 may be controlled from the pilot's compartment 12 by suitable control cables in a conventional fashion.

A tail assembly of conventional construction is shown at 18 and it includes a rudder 20 and ailerons 22. A landing wheel is shown at 24 and it is supported in a conventional fashion by gear 26.

The annular wing of the aforementioned power tube assembly is identified by numeral 28 and is formed with a cylindrical peripheral surface 30 of zero camber. The radially inward surface of the annular wing is cambered as shown at 32 to provide structural rigidity, and the forward leading edge 34 of the annular wing is formed with a knife-like edge to provide shearing of the air and to establish an effective stream tube with a minimum of ambient air disturbance. The axial length of the annular wing is approximately equal to the radius of the wing, although we contemplate that it may be desirable under some circumstances to form the wing with an axial length somewhat greater than the radius.

Referring to Figs. 2 and 3, radial transverse struts are provided near the leading edge of the annular wing as indicated at 36, said struts being four in number. By preference, the struts are displaced 90° relative to each other so that two struts extend horizontally and the remaining two struts extend vertically. In a similar fashion, struts 38 are disposed near the trailing edge section of the annular wing, and by preference these struts are four in number. The radially outward extremities of the struts 36 and 38 are rigidly joined to the structural members of the annular wing, and known aircraft construction techniques can be employed for this purpose. The radially inward extremities of the forward struts 36 support a bearing 40 which in turn is adapted to rotatably journal an extension 42 of a propeller shaft.

The power tube assembly shown includes a propeller 44 and a conventional aircraft engine 46, and the engine in turn may be mounted on the fuselage 10 in the usual fashion. We have shown engine supporting brackets 48 and 50 and these brackets need not be modified in the process of converting a conventional aircraft into our improved aircraft.

The engine firewall is identified by numeral 52 and it has secured thereto four brackets 54 of U-shaped cross section, as indicated in Fig. 4. These brackets may be welded to the firewall 52, as indicated. Brackets 53 are adapted to receive the radially inward ends of the rearward struts 38 and the bolts 55 may be used to anchor the struts 38 in place, thereby forming a rigid mounting means for supporting the annular wing.

As best observed in Figs. 2 and 3, the frontal area of the engine 46 and the firewall 52 is relatively small in comparison to the total frontal area of the annular wing. The ratio of these areas is such that the air displaced by the power tube assembly may be used entirely for the purpose of obtaining useful thrust.

The forward struts 36 have secured thereto control surfaces 54 at a radially outward location. These control surfaces are adapted to be oscillated about radial axes by means of a conventional cable system.

In the embodiment of Fig. 1 the control surfaces are identified by numerals 54 and they include a forward portion 58 and a radially outward portion 56. The portions 58 and 56 are not integral as in the embodiment of Figs. 5 and 6, but they are formed in two parts, as indicated. However, each of these parts is adapted to rotate about a common radial axis. In each of the embodiments the forward portions of the control surface are pivotally connected to the forward struts. The radially outward portions 56 are adapted to be controlled independently of the forwardly disposed portions and they are adapted to counteract the engine torque reaction, thereby maintaining the aircraft in stable flight regardless of the degree of engine throttle opening.

Forward landing gear is shown at 60 and this includes wheel 62 and a landing wheel support 64. The support 64 in turn may be secured to the lower portion of the annular wing 28 in any suitable fashion.

Referring next to Figs. 5 and 6, we have illustrated a second aircraft construction which may utilize the power tube assembly previously described. The aircraft fuselage is generally identified by numeral 66 and it is characterized by a conventional elongated form. A nose portion 68 is provided, as shown, at the forward portion of the fuselage and a tail section of reduced cross sectional dimension is provided at the rear fuselage portion, as indicated at 70. The nose portion 12 includes a canopy 72 which surrounds a cockpit compartment within which a chair structure 74 is mounted. A conventional control stick or other similar control element is situated within the cockpit compartment, as indicated at 76, and conventional instruments may be provided, as shown, within an instrument panel section 78.

A forward landing gear is provided, as shown, and it includes a pair of structural support members 80 which rotatably journal a wheel 82, said structural members 80 being secured in a conventional manner to the fuselage bracing and longitudinal structural runners. A tail wheel 84 may be mounted on the structural members of the rear tail section 70 in a conventional manner, as indicated.

A large diameter annular wing is generally designated in Fig. 5 by numeral 86 and is secured to an intermediate portion of the elongated fuselage structure 66 at one side thereof by means of conventional wing braces. Another identical wing may be similarly secured to the opposite side of the fuselage 66 in laterally adjacent relationship with respect to the wing 86, said wings replacing the wing surfaces commonly associated with aircraft of this type.

The annular wing 86 defines a continuous cylindrical annulus having a length to diameter ratio approximately equal to 0.5. The outer surface 88 of the wing 86 is cylindrical in shape and any straight line contained in the peripheral surface 88 is parallel to the central axis of the wing 86. The inner surface 90 is cambered, as shown, for the purpose of increasing the cross sectional moment of inertia of the wing 86 at any axial station thereby increasing the structural rigidity of the unit. By preference, the location of the point of maximum camber of the wing 86 is located at a point which is between 25% and 30% of the chordal length, the chordal reference line being contained in the outer cylindrical surface 88.

The leading edge portion of the wing 86 is indicated at 92 and the trailing edge portion is indicated at 94. Radially extending strut members 96 are transversely disposed across the inlet opening defined by the leading edge 92 of the wing 86, and they are joined together in the vicinity of the central axis of the wing 86 to form a rigid supporting structure. The struts 96 are situated at 90° intervals so that two of the struts are located vertically and the other two are situated in a horizontal plane.

Similarly, diametrically extending strut members are disposed across the outlet opening defined by trailing edge 94 of the wing 86, as indicated at 98, said strut members preferably being four in number and arranged in vertical and horizontal planes in a fashion similar to the disposition of strut members 96. The strut members 98 are structurally joined to the annular wing 86 and they are joined to a common central portion at the central axis of the wing 86 to provide a rigid structural assembly. By preference, each of the strut members is in the form of a double cambered airfoil having a relatively large length to width ratio over which the flow pattern may for all practical purposes be assumed to be two dimensional.

We have schematically illustrated a radial air cooled aircraft engine in Fig. 5 and have identified the same by means of numeral 100. The engine 100 includes a housing 102 which is secured to the central portion of the intersecting strut assembly comprised of the strut members 98. A power output shaft extension 104 extends from the engine 100 and has secured thereto the hub portion 106 of a propeller 108. An anterior portion 110 of the shaft extension 104 is rotatably journalled at 112 to the central portion of the strut assembly comprised of the strut members 96, at the leading edge station of the wing 86. By preference, the propeller 108 is axially positioned within the wing 86 at a location which corresponds to the maximum camber of the wing 86.

A first pair of vertically positioned control surfaces 114 are situated on the upstream side of each annular wing, as indicated, and they are journalled on the vertically positioned struts 90 for rotation about a radial axis. Similarly, a second pair of horizontal control surfaces 114 is positioned on the upstream side of the wing 86 and each such control surface is journalled on the horizontally positioned strut members 96 for rotation about a horizontal radial axis. The control surfaces 114 are preferably of the double cambered airfoil type and they may be actuated by means of a conventional control cable system adapted to be connected to the personally operable control member 76 within the pilot's compartment. The vertical control surfaces 114 of one wing may be operated in tandem and the horizontal control surfaces 114 of each wing may similarly be operated in tandem. Also, we contemplate that the control surfaces 114 for one wing may be controlled independently of the control surfaces of the other wing. Each of the control surfaces 114 includes a forwardly disposed portion and a radially outward portion which are integrally joined, as indicated, the forward portion of control surfaces 114 being identified by numeral 114′ and the radially outward portion thereof being identified by numeral 114″.

Each of these control surfaces 114 is adapted to turn as a unit and the forward portion thereof provides the necessary control to establish aircraft stability and the radially outward portion of the control surfaces establishes a balancing torque which eliminates stressing of the control cable system. The radially outward portion is situated in a relatively undisturbed region of the air and it is elongated in an axial direction so that the center of pressure thereof will be displaced rearwardly sufficiently far to provide a counterbalancing torque for opposing the moment acting on the forward portions of the control surfaces.

The tail section 70 includes a conventional vertical tail surface or rudder 118 and a conventional horizontal tail surface or elevator 120, and each of these members may be independently controlled from the pilot's compartment of the forward portion of the fuselage by means of a suitable control cable system.

In each of the embodiments of the invention herein described the propellers are adapted to direct a flow of air through the associated annular wings, the mass rate of flow being dependent upon the amount of available power being supplied by the engine. The frontal area of the engines is relatively small in comparison with the transverse cross sectional area of the annular wings so that the degree of parasitic drag created by the engines is relatively small. The annular wings are effective to shear the air and to control the flow air displaced by the propellers so that the free air stream is not unduly disturbed during flight. Also, the wings substantially eliminate propeller losses due to end circulation. The increase in propeller efficiency and the reduction of losses due to the disturbance of the free air stream in turn permits the use of an engine with a lower rated horsepower and a propeller with a reduced tip diameter.

In the embodiment of Figs. 5 and 6 the propellers 108 on either side of the fuselage are adapted to rotate in opposite directions so that the torque reaction of one propeller will counterbalance the torque reaction of the other.

Having thus particularly described the principal features of our instant invention what we claim and desire to secure by U.S. Letters Patent is:

1. An aircraft comprising a fuselage, a power tube assembly including an engine and a propeller shaft, supporting structure for mounting said engine on said fuselage, an annular wing having a cylindrical outer surface and a forward leading edge of knife-like configuration, the geometric axis of said outer surface extending in a forward and rearward direction, radial struts situated at the forward end and at the rearward end of said annular wing, means for journalling said propeller shaft on the forward struts, means for securing the rearward struts to said fuselage in the vicinity of the supporting structure for said engine, said annular wing defining a stream tube, the air bounded by said stream tube being displaced by said power tube assembly, said annular wing being adapted to shear the air, the air mass displaced providing both lifting force and thrust components, and control surfaces journalled on the forwardly situated axial struts, each control surface having a forwardly disposed portion radially inward of the outer periphery of said wing and another portion disposed radially outward of said wing, the forwardly disposed portion of each control surface being integrally formed with the radially outward portion thereof, said portions being adapted to rotate in unison about a common radial axis, one of said control surface portions being disposed on the forward side of said common radial axis and the other control surface portions being disposed rearwardly of said common radial axis whereby the aerodynamic forces acting on the control surface portions for each control surface produce balanced turning moments.

2. An aircraft comprising a pair of annular wings, a fuselage portion disposed intermediate said wings, said fuselage portion having a transverse dimension substantially smaller than the maximum transverse dimension of said wings, double cambered strut members disposed transversely across each annular wing at axially spaced locations, and an engine powered propeller centrally positioned within each annular wing by said strut members, the axis of revolution of each propeller and the associated annular wing being in concentric relationship, the axial length of said wings being equal to at least the radius of said propellers, the outer peripheral surface of each wing lying in a geometric cylindrical surface of revolution, said wings having a sharp, circular leading edge with an optimum aerodynamic cross section, the inner surface of each wing being cambered to provide structural rigidity to the assembly and to define an internal venturi section, said propellers being located at the throat of the associated venturi section with the tip portions thereof in close proximity to said annular wings and adapted to displace air through said annular wings to provide a vertical force component which is proportional in magnitude to the rate of air mass displacement for any given angle of incidence, the relative movement of said aircraft with respect to the ambient air being characterized by an absence of radial displacement of the air, the entire mass of air passing through said venturi sections being utilized to absorb the energy of said propellers, and control means positioned within the path of movement of said displaced air to provide aerodynamic stability, said annular wings providing the sole means for obtaining lifting and driving force components, said control means including at least two aerodynamic surfaces pivotally mounted on certain of said strut members at an upstream location, one of said aerodynamic surfaces being situated transversely with respect to the other to provide three dimensional control, said aerodynamic surfaces being formed in two integral parts, one part being disposed radially inward of the periphery of the associated annular wing and the other part being disposed radially outward thereof, said parts being adapted for rotation in unison about a radial axis, the axial length of said other part being greater than the corresponding dimension of said one part whereby the force couple acting on said other part balances the force couple acting on said one part.

3. An aircraft comprising a fuselage, an annular wing mounted on said fuselage, thrust producing means mounted within said annular wing, radial struts situated near the leading edge of said wing, and control surfaces pivotally carried by said radial struts, said control surfaces being movable about radial pivotal axes, each of said control surfaces including a first portion disposed on the radially inward side of said annular wing and a second portion disposed on the radially outward side of said wing, the center of pressure of said first portion being located on one side of the pivotal axis of said control surface and the center of pressure of said second portion being located on the opposite side of said pivotal axis.

4. In combination, an annular wing, thrust producing means mounted within said annular wing for displacing ambient air through the same, radially disposed supporting struts situated near the leading edge of said wing, and control surfaces pivotally carried by said radial struts, said control surfaces being movable about radial pivotal axes, each of said control surfaces including a first portion disposed radially inward from the periphery of said annular wing and a second portion disposed radially outward from the periphery of said wing, the span of said radially inward portion being greater than the span of said radially outward portion, the center of pressure of said first portion being located on the upstream side of the pivotal axis of said control surface and the center of pressure of said second portion being located on the downstream side of said pivotal axis, the distance between the center of pressure of said radially outward portion from said pivotal axis being greater than the distance of the center of pressure of said radially inward portion from said pivotal axis.

5. An aircraft comprising a fuselage, an engine including a propeller shaft, a supporting structure for mounting said engine on said fuselage, an annular wing having a cylindrical outer surface and leading and trailing edges of knife-like configuration, the geometric axis of said outer surface extending in a forward and rearward direction, radial struts situated at the forward end and at the rearward end of said annular wing, means for journalling said propeller shaft on the forward struts, means for securing the rearward struts to said fuselage in the vicinity of the supporting structure for said engine, and control surfaces pivotally connected to said forward struts on transversely directed pivot axes, each control surface having a portion situated radially inward from said outer surface and a portion situated radially outward from said outer surface at the rearward side of said pivotal axis.

6. An aircraft comprising a fuselage, a power tube assembly including an engine and a propeller shaft, supporting structure for mounting said engine on said fuselage, an annular wing having a cylindrical outer surface and a forward leading edge of knife-like configuration, the geometric axis of said outer surface extending in a forward and rearward direction, radial struts situated at the forward end and at the rearward end of said annular wing, means for journalling said propeller shaft on the forward struts, means for securing the rearward struts to said fuselage in the vicinity of the supporting structure for said engine, said annular wing defining a stream tube and the air bounded by said stream tube being displaced by said power tube assembly, said annular wing being adapted to shear the air, the air mass displaced providing both lifting force and thrust components, and control surfaces pivotally connected to said forward struts, on transversely directed pivot axes, each control surface having a portion situated radially inward from said outer surface at the forward side of the pivotal axis of the control surface and a portion situated radially outward from said outer surface at the rearward side of said pivotal axis.

7. An aircraft comprising a fuselage, a power tube assembly including an engine and a propeller shaft, supporting structure for mounting said engine on said fuselage, an annular wing having a cylindrical outer surface and leading and trailing edges of knife-like configuration, the geometric axis of said outer surface extending in a forward and rearward direction, radial struts situated at the forward end and at the rearward end of said annular wing, means for journalling said propeller shaft on the forward struts, means for securing the rearward struts to said fuselage in the vicinity of the supporting structure for said engine, said annular wing defining a stream tube and the air bounded by said stream tube being displaced by said power tube assembly, said annular wing being adapted to shear the air, the air mass displacement providing both lifting force and thrust components, and control surfaces journalled on the forwardly situated axial struts for movement about transverse pivotal axes, each of said control surfaces having a forwardly disposed portion radially inward of the outer periphery of said wing and another portion disposed radially outward of said wing, said inward and outward portions being disposed on opposite sides of said pivotal axis, the center of pressure of said outward portion being farther from said pivotal axis than the center of pressure of said inward portion.

8. An aircraft comprising a fuselage, a power tube assembly including an engine and a propeller shaft, supporting structure for mounting said engine on said fuselage, an annular wing having a cylindrical outer surface and a forward leading edge of knife-like configuration, the geometric axis of said outer surface extending in a forward and rearward direction, radial struts situated at the forward end and at the rearward end of said annular wing, means for journalling said propeller shaft on the forward struts, means for securing the rearward struts to said fuselage in the vicinity of the supporting structure for said engine, said annular wing defining a stream tube and the air bounded by said stream tube being displaced by said power tube assembly, said annular wing being adapted to shear the air, the air mass displaced providing both lifting force and thrust components, and control surfaces journalled on said forward struts for movement about transverse pivotal axes, each of said control surfaces having a forwardly disposed portion radially inward of the outer periphery of said wing and another portion disposed radially outward of the outer periphery of said wing, the radially outward portion of said control surfaces being movable about a radial axis and adapted to be independently controlled to compensate for engine torque reaction, said inward and outward portions being disposed on opposite sides of said pivotal axis, the center of pressure of said inward portion being closer to said pivotal axis than the center of pressure of said outward portion, whereby each control surface is aerodynamically balanced.

9. An aircraft comprising a pair of annular wings, a fuselage portion disposed intermediate said wings, strut members disposed transversely across each annular wing at spaced axial locations, an engine powered propeller centrally positioned within each annular wing by said strut members, the axis of revolution of each propeller and the associated annular wing being in concentric relationship, the axial length of each wing being equal to at least the radius of said propellers, the tip portions of said propellers being in close proximity to said annular wing, the inner surface of said wings being cambered to provide structural rigidity to the assembly and to define an internal venturi section, each propeller being located in the throat of the associated venturi section and adapted to displace air therethrough to provide a vertical force component which is proportional in magnitude to the rate of air mass displacement for any given angle of incidence, and control means positioned within the path of movement of said displaced air to provide aerodyanmic stability, said control means including at least two aerodynamic surfaces pivotally mounted on certain of said strut members at an up-stream location, one of said aerodynamic surfaces being situated transversely with respect to the other to provide three dimensional control, each aerodynamic surface being formed in two parts, one part thereof being situated radially inward of the periphery of the associated annular wing and the other part thereof being disposed radially outward of the associated annular wing, the radially inward part of each aerodynamic surface being disposed forward of its pivotal axis and the radially outward part thereof being disposed rearwardly of its pivotal axis, said control surfaces thereby being aerodynamically balanced.

References Cited in the file of this patent

FOREIGN PATENTS

| | | |
|---|---|---|
| 91,640 | Austria | Mar. 10, 1923 |
| 893,866 | France | Feb. 28, 1944 |
| 985,498 | France | Mar. 14, 1951 |